United States Patent
Pockrandt

(10) Patent No.: US 6,657,314 B2
(45) Date of Patent: Dec. 2, 2003

(54) MANIPULATION-PROOF INTEGRATED CIRCUIT

(75) Inventor: Wolfgang Pockrandt, Reichertshausen (DE)

(73) Assignee: Infineon Technologies AG, Munich (DE)

( * ) Notice: Subject to any disclaimer, the term of this patent is extended or adjusted under 35 U.S.C. 154(b) by 137 days.

(21) Appl. No.: 09/963,976

(22) Filed: Sep. 26, 2001

(65) Prior Publication Data

US 2002/0060359 A1 May 23, 2002

Related U.S. Application Data

(63) Continuation of application No. PCT/EP00/01764, filed on Mar. 1, 2000.

(30) Foreign Application Priority Data

Mar. 26, 2001 (EP) .......................................... 99 106 321

(51) Int. Cl.$^7$ ............................................. H01L 23/98
(52) U.S. Cl. ....................... 257/922; 257/679; 257/678; 713/194; 713/189; 337/225; 361/672; 365/33; 380/52
(58) Field of Search ................................. 257/679, 922, 257/678; 365/53; 380/52; 713/194, 189; 337/225; 361/672

(56) References Cited

U.S. PATENT DOCUMENTS 5,053,992 A 10/1991 Gilberg et al.
5,861,662 A 1/1999 Candelore

FOREIGN PATENT DOCUMENTS

EP 0 860 882 A2 8/1998

*Primary Examiner*—Tom Thomas
*Assistant Examiner*—Junghwa Im
(74) *Attorney, Agent, or Firm*—Laurence A. Greenberg; Werner H. Stemer; Gregory L. Mayback

(57) ABSTRACT

The integrated circuit has a circuit with information that is protected by a covering shielding level. A network with a large number of nodes is formed in the shielding level. Some of the nodes are linked to a comparator for a nominal-actual comparison. The comparator checks for a characteristic output current from each node. Errors on the characteristic output current lead to a change in the information which is stored in the circuit, so that the latter is protected against manipulation or analysis.

12 Claims, 1 Drawing Sheet

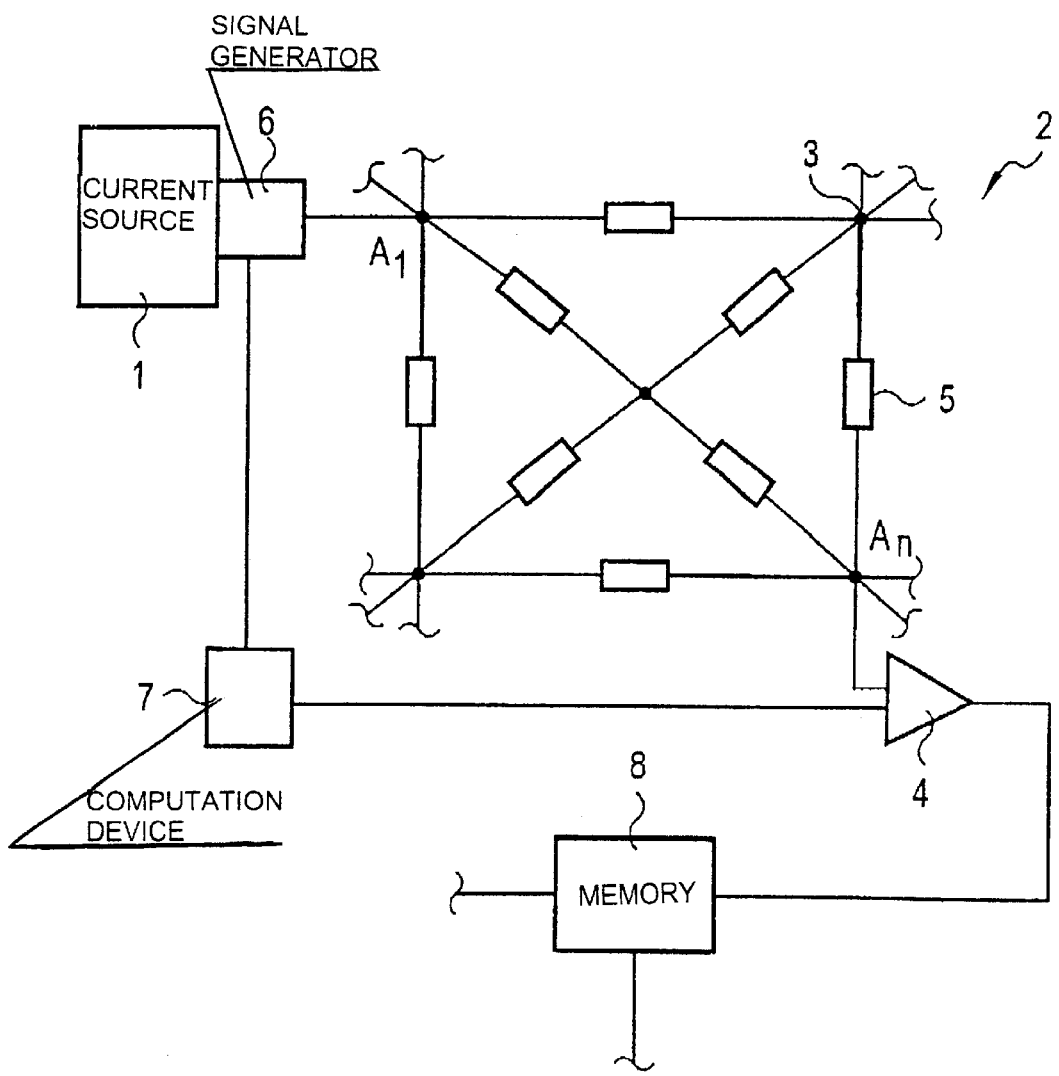

MANIPULATION-PROOF INTEGRATED CIRCUIT

CROSS-REFERENCE TO RELATED APPLICATION

This application is a continuation of copending International Application No. PCT/EP00/01764, filed Mar. 1, 2000, which designated the United States.

BACKGROUND OF THE INVENTION

FIELD OF THE INVENTION

The invention lies in the integrated technology field. More specifically, the invention relates to an integrated circuit and, in particular, to an integrated circuit which ensures reliable protection against analysis and manipulation, even when using modern analysis and manipulation systems.

Recently, protection of integrated circuits against analysis and manipulation has been becoming increasingly important. In this context, there is a major requirement to protect the information contained in integrated circuits against being analyzed or changed by unauthorized third parties. For the purposes of this application, the term "information" should be understood in its widest sense and, for example, is intended to cover data, software programs, control lines and the like.

One previously normal method for protecting critical information against analysis and manipulation is for this information to be kept in a level that is as deep as possible in the integrated circuit. In this way, the circuit diagram is protected, at least against optical analysis.

Furthermore, it is normal to cover the information that is concealed in the deep level with lines associated with the circuit in a level located above it. However, it is difficult to produce this concealment over the entire area and consistently. Furthermore, using modern appliances such as a FIB (focused ion beam) system, it has become possible to remove the lines used for concealment and to link them again in such a manner that they can no longer prevent intentional analysis or manipulation. Better protection is achieved if a layer which is wired on its own and is used only for shielding the critical information is provided in an upper level. This allows the layer that contains the information to be concealed in a consistent manner. However, one problem that remains is that, using modern equipment such as the FIB, this wired level can be manipulated, and its protective effect can thus be entirely or partially cancelled out.

SUMMARY OF THE INVENTION

It is accordingly an object of the invention to provide a tamper-proof integrated circuit, which overcomes the above-mentioned disadvantages of the heretofore-known devices and methods of this general type and which ensures reliable protection of the information contained in the integrated circuit, even when modern analysis or manipulation tools are utilized.

With the foregoing and other objects in view there is provided, in accordance with the invention, an integrated circuit, comprising:

a first level containing a circuit with information to be protected;

at least one second level covering the first level on one side and enabling access to the first level from outside the integrated circuit, and a network formed in the at least one second level;

the network having a plurality of nodes connected to at least one current source;

a comparator linked to at least some of the nodes for nominal-actual comparison of currents carried by respective the nodes;

the network being configured such that a characteristic output current can be tapped off when an input current is fed into the network from the current source at each of the nodes linked to the comparator for nominal-actual comparison; and the comparator for the nominal-actual comparison being configured such that an error in the characteristic output current from the respective node results in a change to the information in the circuit in the first level.

In other words, the invention thus relates to an integrated circuit which has a first level wherein a circuit with information to be protected is formed. This first level is also referred to in the following text as the information level. The integrated circuit may be formed, for example, in a semiconductor chip. The term "level" could in this case not be understood as meaning that this may be an absolutely planar surface.

The integrated circuit furthermore has at least one second level, which covers the first level on one side and from which the information level can be accessed from outside the integrated circuit. A network having a large number of nodes is formed in the second level, which is also referred to as the network level in the following text. This network is connected to at least one current source.

According to the invention, at least some of the nodes in the network level are connected to a comparator (here to be understood in its broadest meaning, namely as any device or combination which enables nominal-actual comparison of the currents transmitted by the respective nodes). Furthermore, the network is designed such that a characteristic output current is produced when an input current is fed into the network from the at least one current source at each of the nodes which are linked to the nominal-actual comparison means, and this output current can be tapped off there. The means for the nominal-actual comparison are designed such that the information stored in the circuit in the first level is changed if the comparison means find an error from the characteristic output current from the respective node.

Thus—as was already known from the prior art—a separate shielding level is likewise used in the integrated circuit according to the invention, and is located above the level carrying the information to be protected. However, in contrast to the prior art, a network is formed in this shielding level whose nodes are at least in some cases linked via the nominal-actual comparison means to the circuit of the information level located underneath it. An input current is fed into the network from at least one current source, is passed on via the network and leads, at the individual nodes, to an output current which is characteristic for each node. These characteristic output currents are tapped off at the nodes which are connected to the nominal-actual comparison means, and are checked using the means for a nominal-actual comparison to determine whether the respectively tapped-off characteristic output current matches the output current to be expected for that respective node. If this is not the case, the information stored in the circuit in the first level is changed.

An error is found between the nominal value and the actual value whenever any external intervention takes place in the network for the purpose of manipulation or analysis.

The configuration according to the invention of the network level and the interlinking mean that any such external intervention will invariably lead to a change to the values at a number of nodes. These complex changes would need to be taken into account and corrected in any attempt to analyze the circuit. Owing to the large number of changes produced, this is, however, impossible in practice.

The integrated circuit according to the invention therefore has excellent protection against analysis and manipulation.

The network of the integrated circuit according to the invention is preferably designed such that a large number of resistances and/or capacitances and/or inductances are arranged between the nodes. This means that the input current produced by the at least one current source produces at each node an output current which is different and is characteristic of that node, depending on the route on which it passes through the network and which resistances, capacitances or inductances is has passed through.

In an integrated circuit which is formed in a semiconductor chip, the network can preferably be produced by doping a layer of semiconductor material. A polysilicon layer is expediently used for this purpose. The resistance can in this case be controlled, for example, by the nature and/or concentration of the implanted materials.

n-in-n doping or p-in-p doping is particularly preferred. The network structures that are produced then differ from the surface surrounding them only in the doping concentration. This makes it extremely difficult to detect the network. Optical analysis of the network is virtually impossible, and it is very much more difficult to identify possible points for potential manipulation.

In order to make it even harder to analyze and manipulate the information to be protected, the current source in one preferred embodiment of the invention is a signal generator which allows variable input signals to be fed into the network. The input signal can be varied, for example, by varying the current level over the course of time.

It is particularly preferable for the at least one current source to be connected to at least some of the nodes. In this case, the input signals can also be varied by alternately feeding the current in at different nodes. In this case as well, the current which is fed in may itself also be varied with time.

In one particularly preferred embodiment, the integrated circuit according to the invention has at least one computation means which is used to calculate the respective output signal to be expected for each input current which is fed into the network at a specific time, for each node at which a nominal-actual comparison is carried out. This at least one computation means is firstly connected to the current source in order that the values of the respective input signals can be transmitted as the basis of the calculation, and is secondly connected to the means for the nominal-actual comparison, to which the calculated nominal values are emitted.

An operational amplifier is used, according to the invention, as the preferred means for the nominal-actual comparison.

If the means for the nominal-actual comparison find that the actual value for the node to be checked does not match the nominal value this leads, in the integrated circuit according to the invention, to the information which is stored in the circuit in the first level being changed. It is particularly preferable for the change to be in the form of a circuit reset. Thus, for example, all the information stored since the circuit was first brought into use can be erased. It is thus impossible to investigate or manipulate this information.

The method of operation of the integrated circuit according to the invention will be explained in more detail in the following text with reference to a drawing.

Other features which are considered as characteristic for the invention are set forth in the appended claims.

Although the invention is illustrated and described herein as embodied in a manipulation-proof integrated circuit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The sole FIGURE is a schematic detail of a network, which forms the second level or network level of an integrated circuit according to the invention.

DESCRIPTION OF THE PREFERRED EMBODIMENTS

Referring now to the FIGURE of the drawing in detail, the network level shown therein covers a first level, wherein a circuit with information to be protected is formed. The network 2 has a large number of nodes 3, which are linked to one another in a complicated manner. Resistances 5 are in each case arranged between the individual nodes 3, and in this case have different resistance values. In addition to resistances 5, or in the alternative, there may be provided capacitances and/or inductances connected between the nodes. The circuit symbols identified as 5 thus represent resistors, and/or capacitors, and/or inductors.

A current source 1, which is in the form of a signal generator 6, is connected to one of the nodes, namely, a node $A_1$. Variable input signals are fed into the network at the node $A_1$ through this configuration. Output currents which are characteristic of the respective node at any given time are produced at the various nodes in the network 2 as a function of the input current, which is varied over time. The characteristic output current for each of the nodes is composed of the sums of the individual currents which have been passed to the respective node on various routes, with different resistances, in the network.

A nominal-actual comparison of the output current that is to be expected at the node with the actual output current is carried out at some of the nodes 3 in the network 2. In the FIGURE, one such node is annotated $A_n$. This node is connected to an operational amplifier 4, which provides the function of nominal-actual comparison. The operational amplifier 4 obtains the nominal value from a computation means 7 which in turn calculates the output signal or the output current to be expected at the node on the basis of the values of the input signals transmitted by the current source or of the input current supplied to the network at a specific time. The nominal-actual comparison by means of the operational amplifier 4 is expediently carried out continually at specific time intervals.

If the network 2 is manipulated by external intervention, the complex networking of the individual nodes means that even a locally confined intervention leads to a change over a large area. The values are therefore changed at a number of nodes. If, for example, the output signal tapped off by the operational amplifier 4 at the node $A_n$ does not match the calculated output signal, this leads, in the illustrated case, to a memory 8 in the circuit in the first level being erased.

Identical or similar changes can be produced in other areas of the circuit to be protected.

Thus, overall, the change at a number of nodes in the network in the integrated circuit according to the invention leads to a wide range of changes to the information stored in the circuit in the first level. Even minor interventions in the integrated circuit according to the invention therefore render it virtually impossible to draw any conclusions relating to the original circuit diagram or to the information contained therein.

I claim:

1. An integrated circuit, comprising:
   a first level containing a circuit with information to be protected;
   at least one second level covering said first level on one side and enabling access to said first level from outside the integrated circuit, and a network formed in said at least one second level;
   said network having a plurality of nodes connected to at least one current source;
   a comparator linked to at least some of said nodes for nominal-actual comparison of currents carried by respective said nodes;
   said network being configured such that a characteristic output current can be tapped off when an input current is fed into said network from said current source at each of said nodes linked to said comparator for nominal-actual comparison; and
   said comparator for the nominal-actual comparison being configured such that an error in the characteristic output current from the respective said node results in a change to the information in said circuit in said first level.

2. The integrated circuit according to claim 1, which comprises a multiplicity of electrical elements selected from the group consisting of resistances, capacitances, and inductances connected in said network between said nodes.

3. The integrated circuit according to claim 2, wherein in that the network is produced by doping a polysilicon layer.

4. The integrated circuit according to claim 3, wherein said network is formed with n-in-n doping.

5. The integrated circuit according to claim 3, wherein said network is formed with p-in-p doping.

6. The integrated circuit according to claim 1, wherein said comparator is an operational amplifier configured for the nominal-actual comparison.

7. The integrated circuit according to claim 1, wherein said at least one current source is a signal generator for feeding variable input signals into the network.

8. The integrated circuit according to claim 7, wherein said at least one current source for feeding in the current is connected to at least some of said nodes.

9. The integrated circuit according to claim 1, wherein said at least one current source for feeding in the current is connected to at least some of said nodes.

10. The integrated circuit according to claim 7, which further comprises a computation device connected to said current source and to said comparator and configured to calculate an output signal to be expected from a respective said node.

11. The integrated circuit according to claim 10, wherein said comparator is configured to compare the output signal to be expected from a respective said node with the output signal from the respective said node.

12. The integrated circuit according to claim 1, wherein said comparator for the nominal-actual comparison is configured such that said circuit in said first level is reset if any error from the nominal value is found.

* * * * *

UNITED STATES PATENT AND TRADEMARK OFFICE
CERTIFICATE OF CORRECTION

PATENT NO. : 6,657,314 B2
DATED : December 2, 2003
INVENTOR(S) : Wolfgang Pockrandt Page 1 of 1

It is certified that error appears in the above-identified patent and that said Letters Patent is hereby corrected as shown below:

<u>Title page,</u>
Item [30], should read as follows:

-- [30]   Foreign Application Priority Data

Mar. 26, 1999   (EP) …………….. 991 06 321 --

Signed and Sealed this

Sixteenth Day of March, 2004

JON W. DUDAS
*Acting Director of the United States Patent and Trademark Office*